United States Patent [19]

Xavier

[11] Patent Number: 4,723,707
[45] Date of Patent: Feb. 9, 1988

[54] APPARATUS FOR PROVOKING PRECIPITATION

[76] Inventor: Lebrun Xavier, 8, rue des Ciseaux-75006, Paris, France

[21] Appl. No.: 814,192

[22] Filed: Dec. 27, 1985

Related U.S. Application Data

[63] Continuation-in-part of Ser. No. 711,994, Mar. 14, 1985, abandoned, which is a continuation of Ser. No. 506,350, Jun. 21, 1983, abandoned, which is a continuation of Ser. No. 234,338, Feb. 13, 1981, abandoned.

[30] Foreign Application Priority Data

Aug. 28, 1980 [FR] France .................................. 80 18639

[51] Int. Cl.$^4$ ........................ A01G 15/00; E01H 13/00
[52] U.S. Cl. .................................................. 239/14.1
[58] Field of Search ...................... 239/2, 14, 2.1, 14.1, 239/69, 70

[56] References Cited

U.S. PATENT DOCUMENTS

| | | | |
|---|---|---|---|
| 2,741,601 | 4/1956 | MacCready, Jr. | 239/2 R |
| 3,926,369 | 12/1975 | Pearce | 239/14.1 X |
| 4,209,131 | 6/1980 | Barash et al. | 239/69 X |

FOREIGN PATENT DOCUMENTS 0047208  3/1982  European Pat. Off. .............. 239/14

Primary Examiner—Andres Kashnikow
Attorney, Agent, or Firm—McGlew and Tuttle

[57] ABSTRACT

An installation intended to cause precipitation at a site includes a lance for spraying water into the air using a pump that is controlled by a timer. A lightning conductor is erected at the site for protecting the timer and pump from lightning, as well as protecting a tank containing water to be sprayed which is also at the site. A probe for sensing atmospheric conditions that are conducive to rain is also provide at the site. The timer and the probe are controlled by a remotely located computer which, upon information received from the probe, activates the timer which in turn activates the pump.

2 Claims, 2 Drawing Figures

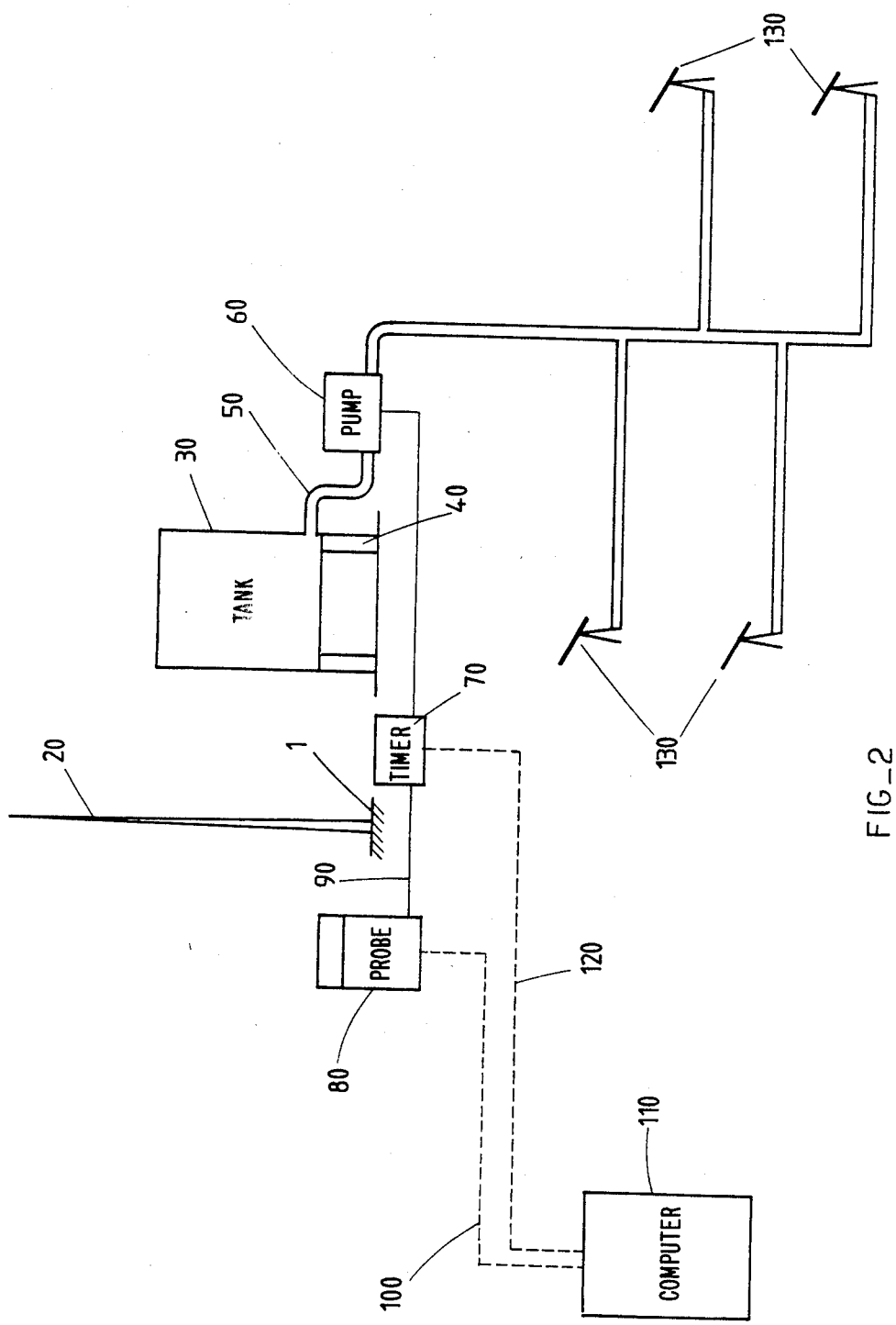
FIG_2

APPARATUS FOR PROVOKING PRECIPITATION

CROSS-REFERENCE TO RELATED APPLICATIONS

The present application is a continuation-in-part application of Ser. No. 711,994 filed Mar. 14, 1985 (now abandoned) which was a continuation of Ser. No. 506,350 filed June 21, 1983 (now abandoned) which in turn was a continuation of Ser. No. 234,338 filed Feb. 13, 1981 (now abandoned).

FIELD OF THE INVENTION

This invention relates to apparatus intended to provoke precipitation from the atmosphere.

BACKGROUND OF THE INVENTION

It is already known that precipitation can be provoked by modification of the energy of the atmosphere, more especially by transmitting or withdrawing acoustic or thermal energy.

The types of apparatus previously employed, however, have been proved to be dangerous. They have also provoked lightning. Moreover, it has been believed that it was possible to provoke precipitation, independently of the state of the atmosphere.

DESCRIPTION OF THE INVENTION

This instant invention provides more effective apparatus, and proposes to make it function only when the conditions in the ambient atmosphere are favorable.

According to the instant invention, the apparatus comprises a system for modification of the energy of the ambient atmosphere, remotely controlled by a command means sensitive to a characteristic of the atmosphere.

The remote control protects service personnel from lightning. Because the apparatus is controlled to operate in accordance with an atmospheric characteristic, it can be made to operate only when there is a real possibility of provoking precipitation as predicted for example, by a remotely-located meteorological station.

The apparatus can comprise a lightning conductor, when it is fixed or in the form of a vehicle.

As a means for transferring energy, the apparatus can for example comprise heating or cooling means, especially means which act by spraying water, means for providing an electric arc, a means of emitting a chemical product or water vapor, etc.

The control means can, for example, comprise a hygrometer sensitive to the humidity of the ambient atmosphere, an optical device sensitive to cloud cover, especially one sensitive to infra-red radiation so that it can function at night, an anemometer, a barometer, and a thermometer.

When the apparatus modifies the atmospheric temperature, it also includes a heat sink surrounded by a thermostatic envelope, with means to open the envelope thermometrically controlled so as to dissipate the heat in the sink when the apparatus (which functions by chilling the atmosphere) is taken out of service.

DESCRIPTION OF THE DRAWINGS

The FIGS. 1 and 2 of the attached drawing illustrate the invention.

A vehicle 2 provided with a lightning conductor 3 rolls on a track 1. The vehicle carries a means 4 for emitting chemical products, as well as a boom 5, for spraying soil or plants on either side of the track 1.

Figure 1:
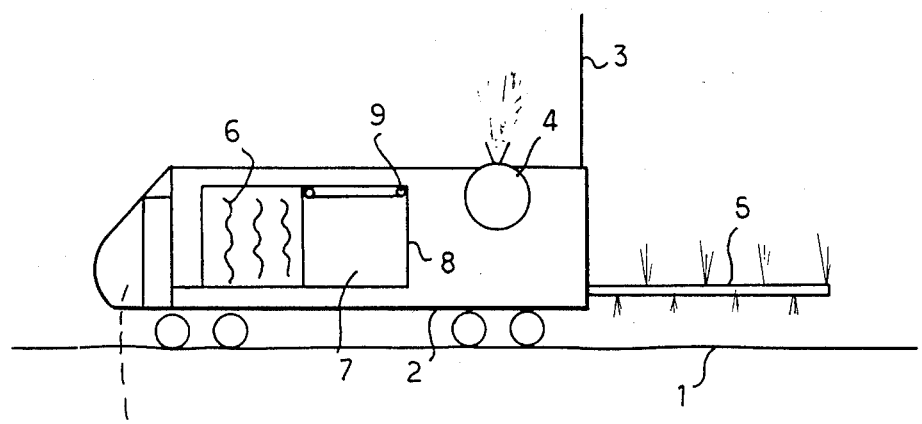
Figure 1:
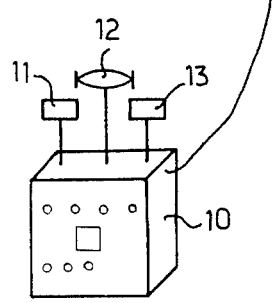

The vehicle also carries electric arc means 6 and a heat sink 7 surrounded by a thermostatic envelope 8 which can open about a hinge 9 provided on its upper surface.

A remote control means 10 controls movement of the vehicle 2 and the functioning of the various devices it carries. Apart from the controlling devices, means 10 comprises a hygrometer 11, an infra-red sensor 12 responsive to cloud cover, and a barometer 13.

When atmospheric conditions, such as those determined by sensors 11 to 13, are favorable, these sensors cause the means 10 to issue commands to make the apparatus function.

When conditions are not favorable, the same sensors stop the apparatus, and cause the envelope 8 to pivot so as to release heat contained in the heat sink.

It is understood that the remote control may be effected by timing means, it being essential that the operator is located remotely from the apparatus before it functions. The apparatus can also be located at a height, for instance on a pylon.

The invention further relates to an apparatus intended to cause precipitation from the water contained in the earth's atmosphere, this apparatus being either fixed or movable, and comprising, as a system for modifying the characteristics of the ambient atmosphere, means for diffusing or speading water, possibly mixed with chemical products, at the place where it is desired to cause precipitation, a timer located on this site and intended to control the means for diffusing the water, a probe, more particularly an optical probe for detecting clouds which, having detected sufficient cloud cover, authorises the timer to set the means in action, these means, the timer and the probe being protected from lightning by a lightning conductor erected at the site and the apparatus further comprising a computer located at a distance from the site and capable of controlling by radio the actuation of the timer and of receiving by radio information from the probe.

Owing to the fact that the timer and the probe may be connected by radio to a computer at some distance from the site where they are located, the user may consult the information supplied by the probe, thanks to the computer, whilst remaining at some distance from the dangerous site where lightning may strike and need only approach the site in order to fill up the means for diffusing the liquid or in order to carry out any other repairs unless the cloud cover is so slight that there is no danger of being struck by lightning.

FIG. 2 of the accompanying drawings illustrates an installation according to the invention.

At a site 1 where it is desired to cause precipitation from the water contained in the earth's atmosphere, a lightning conductor 20 is erected protecting a tank 30 filled with water to which a chemical agent may have been added. The tank 30 is fixed and is mounted on a base 40. The tank could equally be mounted on wheels so as to be movable. Leaving the base of the tank 30 is a duct 50 which conveys water, via a motor-driven pump assembly 60, through projection lances 130 to the site where it is desired to cuase precipitation, once the pump 60 has been actuated by a timer 70, also located at the site 1 and protected by the lightning conductor 20.

The timer is connected to a probe 80 for detecting cloud cover in the atmosphere above the site 1. The probe 80, which is also protected by the lightning conductor 20, is connected to the timer 70 by a line 90 so that the latter receives information from the probe 80. The probe may transmit information by radio, as indicated by the dash-dot line 100, to a computer 110 located away from the site where it is desired to cause precipitation. The timer 70 may be radio-controlled by the computer 110 via the radio link 120 represented by a broken line.

The installation operates as follows. The tank 30 having been filled up beforehand, the probe 80 detects favourable meteorological conditions liable to give rise to precipitation. Through the line 90 it empowers the timer 70 to actuate the pump 60 when the user, having consulted the state of the probe 80 by teleradio, using the computer 110, decides to activate the timer 70.

Alternatively, the probe 80 may automatically trigger the timer 70 a certain time after having detected a suitable cloud cover, for example 2 hours after detecting it.

According to another alternative embodiment, the operator sets the timer going himself so that it activates the pump 60 a certain time after the operator has set the timer 70.

However, in the preferred variant, the user triggers the timer 70 from the computer 110 after receiving information from the probe 80 to the effect that the cloud cover is favourable, once it is decided to cause precipitation at the site 1.

When the tank 30 is empty, the user consults the computer 110 which is located away from the site 1. By means of the link 100, the user is able to discover whether the cloud cover is favourable for precipitation and if there is a risk of lightning. If this is the case, the user does not go near the site 1. If, however, the probe 8 informs him, through the computer 110, that he will not be exposed to any danger by going to the site 1, he will take the opportunity to fill the tank 30 at the site 1 and carry out any other repair or adjustment which may prove necessary.

For this purpose, the probe may also be a probe for detecting the electric field in the ground. This field, which is generally of the order of 100 V/m, increases to 15 to 20 KV/m when a storm is imminent.

This information transmitted by the computer warns the user of the danger of approaching the tank.

All the means and probes protected by the lightning conductor take the energy they require from a battery.

The lightning conductor used is preferably a Faraday cage.

I claim:

1. Installation intended to cause precipitation at a site, with the water contained in the earth's atmosphere, comprising
    means for diffusing water at the site,
    a timer for controlling said means and located at the site,
    a probe located at the site for detecting the atmospheric conditions prevailing at the site and detecting clouds and the conditions favourable to the production of precipitation which may be accompanied by lightning,
    a lightning conductor erected at the site and protecting the means, timer and probe from a bolt of lightning, and
    a computer located at a distance from the site and communicating by radio with the probe in such a way as to gather information from it.

2. Installation as claimed in claim 1, wherein the computer also communicates by radio with the timer and controls it as a function of the information supplied by the probe.

* * * * *